UNITED STATES PATENT OFFICE.

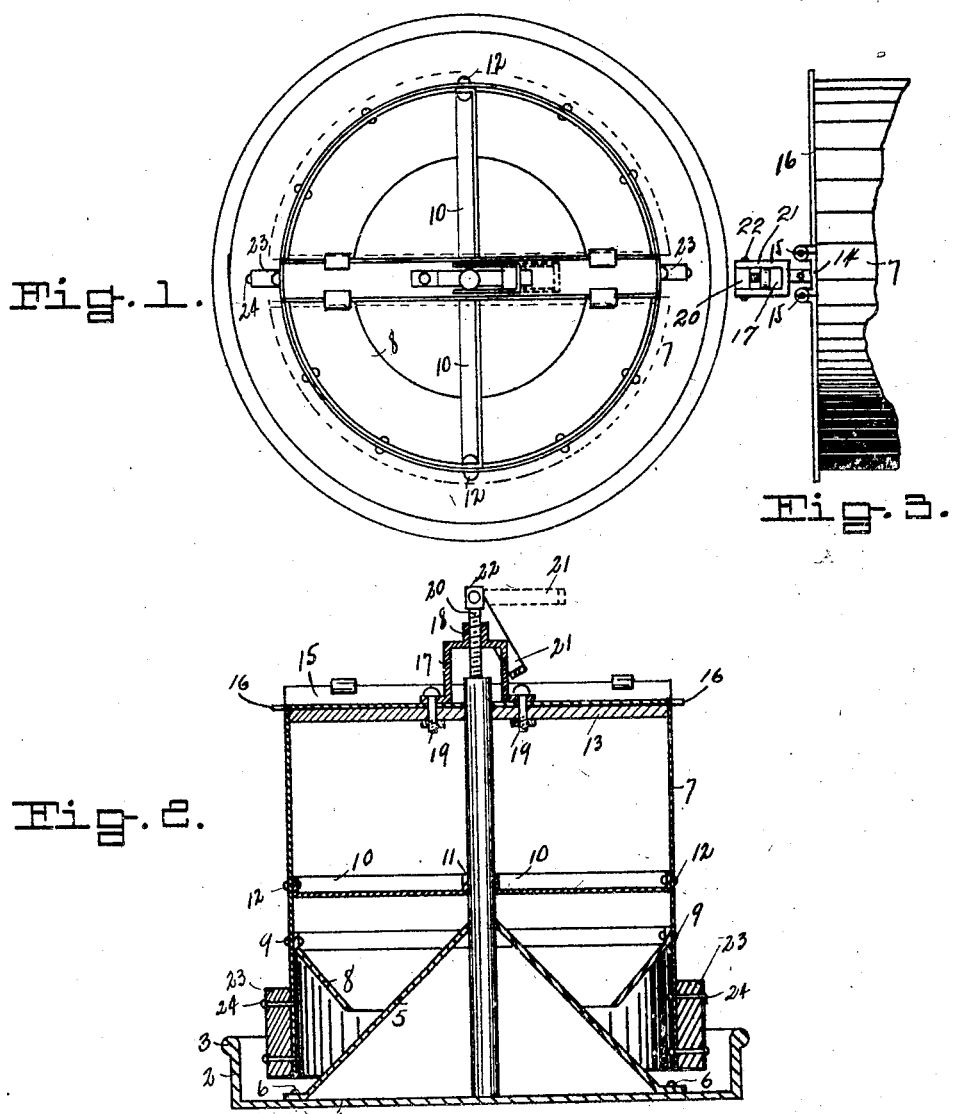

ROBERT OTMERE DOHM, OF DANE, WISCONSIN.

HOG-FEEDER.

1,359,158.  Specification of Letters Patent.  Patented Nov. 16, 1920.

Application filed June 23, 1919. Serial No. 306,246.

*To all whom it may concern:*

Be it known that I, ROBERT OTMERE DOHM, a citizen of the United States, residing at Dane, in the county of Dane and State of Wisconsin, have invented certain new and useful Improvements in Hog-Feeders, of which the following is a specification.

My invention relates to hog feeders in which the feed is automatically supplied by the animals pushing against portions of the device causing the storage drum to revolve; and the objects of my invention are first, to provide a practically storm tight drum for storing the feed; second, to so mount the drum as to have it rotatable and adjustable in regard to the amount of feed that will be available for the animals to eat; and, third, to provide a circular trough from which the hogs can secure the feed.

I attain these objects by the mechanism shown in the accompanying drawing in which—

Figure 1, is a plan;

Fig. 2, is a vertical section;

Fig. 3, is a view showing the cover attachment.

Similar numerals refer to similar parts throughout the several views.

The trough 1 is circular in form with a band 2, upon its periphery extending upward and reinforced at the top 3 thereof. A post 4, is disposed concentrically with the band and extends upward therefrom. A cone shaped member 5, of sheet metal is secured to the trough by rivets or bolts 6, and extending upward surrounds the post about midway. The drum 7, is formed preferably of sheet metal, and an inverted truncated cone 8, is disposed inside near the bottom of same and secured thereto by the rivets 9. Radial braces 10, form a central bearing 11, around the post 4, and are riveted to the drum by rivets 12. A cross bar 13, extends across the top of the drum and forms a bearing around the post. A metal plate 14, with upturned edges 15, is secured on top of the bar and half covers 16, are hinged to the same. A bracket 17, with a central hub 18, is bolted on top of the plate 14, and secured through bar 13, by bolts 19. The said hub 18 is threaded and a screw 20, passes down through same and abuts the top of the post 4.

A bail 21, is hingedly attached to the top of the screw and depends from the bolt 22, and locks over the upper corner of the bracket 17, said bail can be raised when desired for turning the screw. Wings 23 are bolted oppositely to the drum at the bottom edge by bolts 24.

To use my feeder place dry feed in the drum 7, and the same will be supported on top of the inverted cone 8, except what can pass between cone 8, and cone 5, and down cone 5, to the trough 1, the amount passing is regulated by turning the screw 20, up or down which will increase or decrease the opening between the cones, and the hogs pushing against the wings 23, will revolve the drum and prevent the feed from clogging.

Having thus described my invention I claim.

1. In a hog feeder, the combination with a trough circular in form, a band disposed peripherally of said trough and extending upward therefrom, reinforcing means disposed on top of said band, a post disposed concentrically with said band and extending upward, a cone shaped member secured to said trough and extending upward surrounding the post aforementioned to a distance approximately one half its length, a drum revolubly disposed on top of said post, means whereby said drum is vertically adjusted in relation to said trough, an inverted truncated cone disposed inside said drum near the bottom thereof and rigidly secured thereto, braces disposed within said drum and revolubly secured thereto and to said post forming a central bearing for same, a cross bar extending across said drum, a plate provided with upwardly extending flange disposed on top of said bar, covers hingedly attached to said plate, a bracket provided with a central hub disposed on top of said plate and secured to said bar, a screw passing downward through hub aforesaid and abutting top of said post.

2. In a hog feeder, the combination with a trough circular in form, a band disposed peripherally of said trough and extending upward therefrom, reinforcing means disposed on top of said band, a post disposed concentrically with said band and extending upward, a cone shaped member secured to said trough and extending upward and surrounding said post, a drum revolubly disposed on top of said post, an inverted truncated cone disposed inside said drum near the bottom thereof and rigidly secured thereto, braces disposed within said drum and revolubly disposed on said post, forming a central bearing for same, a cross bar extending across said drum, a plate provided with upwardly extending flanges disposed on top of said bar, covers hingedly attached to said plate, a bracket provided with a central hub disposed on top of said plate and secured to said bar, a screw passing downward through hub aforesaid and abutting the top of said post whereby said drum is vertically adjusted in relation to the trough aforesaid, a bail hingedly attached to top of said screw and depending therefrom and locking over top of bracket aforesaid.

In testimony whereof I affix my signature in the presence of two subscribing witnesses.

ROBERT OTMERE DOHM.

Witnesses:
 CHAS. E. PLACKETT,
 TILLIE DE BOWER.